E. C. JENKINS.
VEHICLE BRAKE.
APPLICATION FILED MAY 7, 1914.

1,145,592.

Patented July 6, 1915.
2 SHEETS—SHEET 1.

Witnesses.
C. F. Mason
C. J. Hartnett

Inventor.
E. C. Jenkins
per Southgate & Southgate
Attorneys.

UNITED STATES PATENT OFFICE.

EBENEZER CURTIS JENKINS, OF SHREWSBURY, MASSACHUSETTS.

VEHICLE-BRAKE.

1,145,592.

Specification of Letters Patent.

Patented July 6, 1915.

Application filed May 7, 1914. Serial No. 837,053.

*To all whom it may concern:*

Be it known that I, EBENEZER CURTIS JENKINS, a citizen of the United States, residing at Shrewsbury, in the county of Worcester and State of Massachusetts, have invented a new and useful Vehicle-Brake, of which the following is a specification.

This invention relates to a vehicle brake, especially designed for automobiles but capable of use on other vehicles.

The principal object of the invention is to provide a powerful brake that will stop a car slowly or quickly at the will of the operator without skidding, unduly straining the parts or wearing or tearing the tires; also to provide a construction which in the preferred form of the invention is operated by the lever which controls the speed changing mechanism and will operate therewith so that when running at high speed the car can be slowed up and reversed and the brake applied by manipulating only one lever.

The invention also involves improvements in details of construction and combinations of parts as will appear hereinafter.

Reference is to be had to the accompanying drawings in which—

Figure 1:
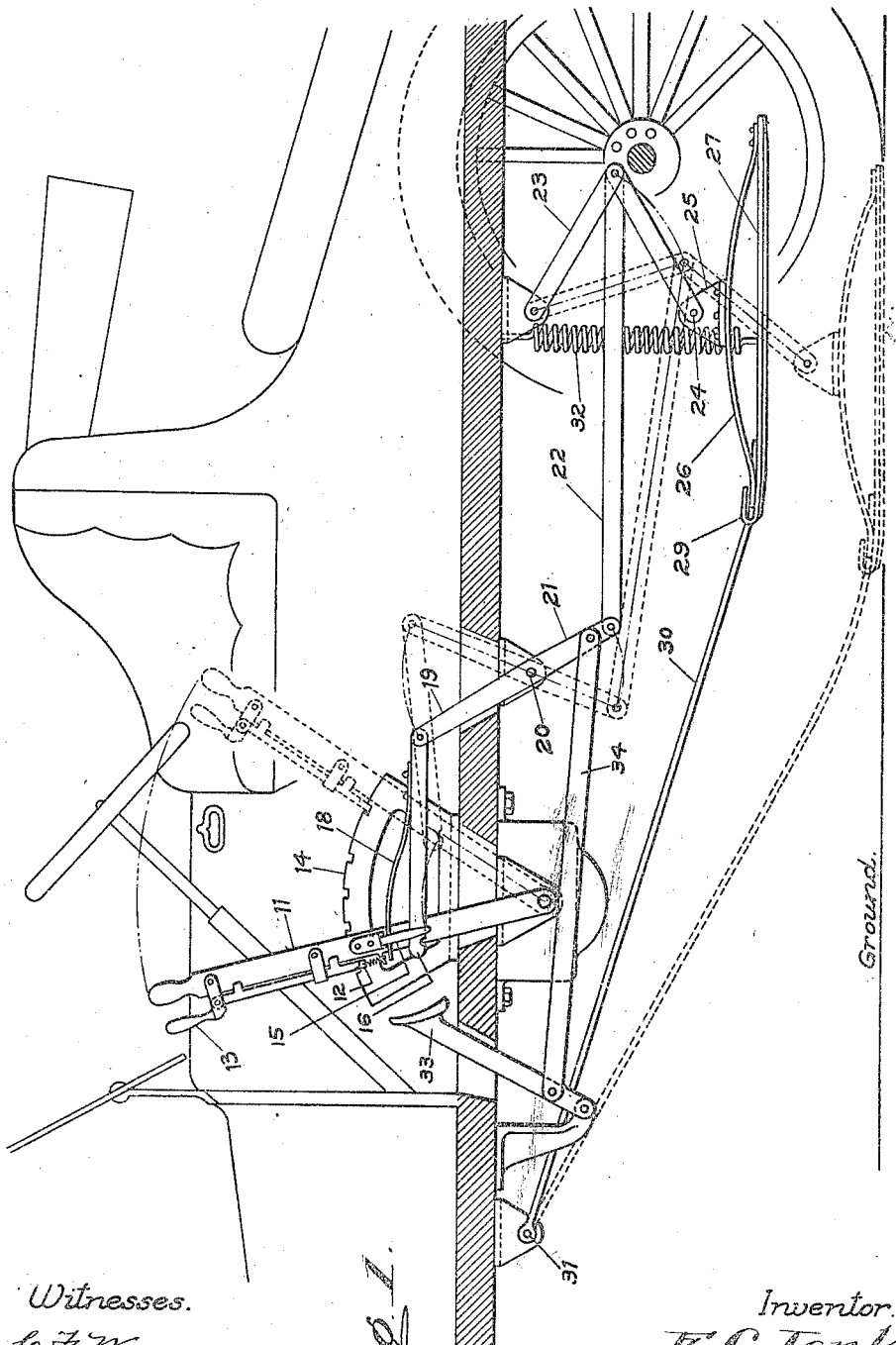
Figure 2:
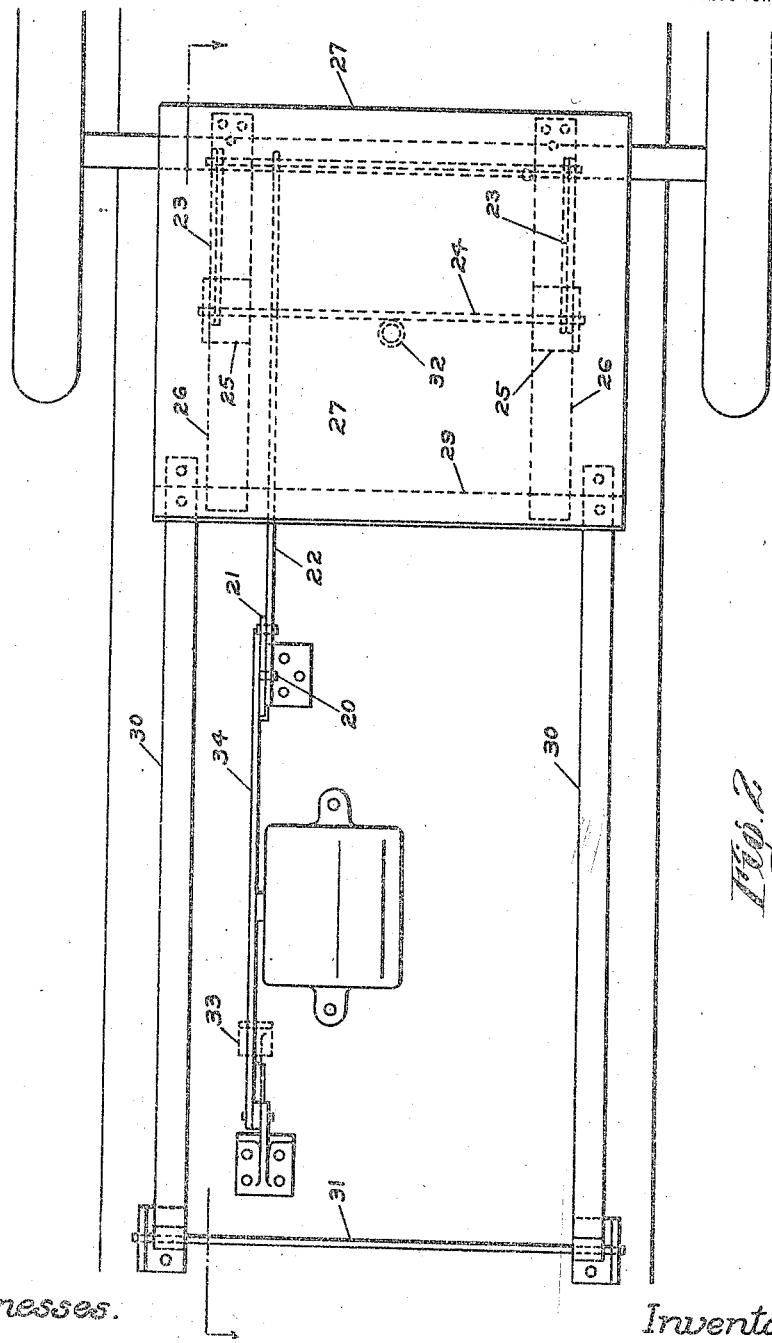

Figure 1 is a longitudinal, vertical, sectional view on the link 1—1 of Fig. 2 of an automobile provided with a preferred embodiment of this invention and showing the brake mechanism in side elevation in its normal inoperative position in full lines and showing it in dotted lines, in the position assumed when the brake is applied, and Fig. 2 is a bottom plan.

The invention is shown as applied to a well known type of automobile body which will not be described in detail as it is well understood. This is provided with a lever 11 by which the speed changes are made. This lever is provided with the usual spring dog 12 connected with a finger lever 13 for operating it and with a segmental rack 14 having notches for receiving the dog and holding the lever in positions for the reverse and two or more speeds forward.

The lever 11 has a projection 15 with a passage therethrough for receiving a movable rod 16 which has a notch in the bottom by which it engages the lower wall of the passage so that the movement of the lever will move this rod. A spring 18 is provided for holding the edge of the rod in contact with the bottom of this passage. This rod is connected at its end with an arm 19 which is fixed to a shaft 20 preferably under the body of the machine. On this shaft also are a pair of arms 21, extending downwardly, each connected by links 22 with the central joint of a toggle lever 23. These toggles are pivoted at the top to the under side of the body and at the bottom to a transverse rod 24. This rod has pivotally connected with it a pair of projections 25 extending upwardly from the middle of two longitudinal springs 26. These springs are connected at their rear ends with a brake plate 27 located substantially in horizontal position. At their forward ends they are also connected with this plate but this connection is a loose one as their front ends simply project beneath an inturned flange 29 projecting from the plate. This provides a yielding but comparatively stiff connection with this brake plate. This plate may be made of metal and provided with a wearing surface underneath, which can be renewed very easily. Its forward end is connected by a pair of links 30 with pivots 31 located under the forward part of the body of the vehicle. This device can be used in addition to any usual type of brakes if desired.

The normal position of the parts being shown in full lines, it will be seen that with the lever in this position the vehicle is proceeding at its highest speed. Now if it is desired to apply the brake, the lever 11 is released from the rack, pushed forward as far as it will go which will cause the notch in the bottom of the rod 16 to come into positive engagement with the lever and thereafter be controlled and operated by it. Then the lever is brought back in the usual way to the position shown in dotted lines to operate the rod and the brake mechanism below so as to expand the toggles and force the brake into contact with the surface of the ground between the rear wheels. The brake is within the control of the operator so that it can be applied with any desired force.

In order to release the brake from the control of the driving lever, the rod 16 is simply raised by hand or in any other desired manner. Then the spring 32 which naturally tends to draw the brake up is free to work and this motion pushes the rod 16 forward. If it is desired to operate the brake by the foot, a foot treadle 33 is pushed. This is connected with the arm 19 by a link 34. Either the foot or the hand mechanism can be used to the exclusion of the other if desired. It will be seen therefore that the brake can be controlled by foot or hand in the form shown. It will also be seen that when controlled by the operating lever this connection is entirely within the control of the operator and that it can be connected with it for operating it without manipulating anything except this lever itself. Moreover, although the brake is applied positively and withdrawn yieldingly, yet when applied it has sufficient play on account of its springs 26 to allow for any unevenness in the road surface and to prevent its being materially injured by coming into contact with a stone or other hard surface.

Although I have illustrated and described only a single embodiment of the invention and shown it as applied to one type of vehicle only, I am aware of the fact that it can be applied to many other vehicles and that modifications in the details of construction can be made without departing from the scope of the invention as expressed in the claims. Therefore, I do not wish to be limited in these respects, but What I do claim is:—

1. The combination with a vehicle and a speed controlling lever, of a brake, a movable rod, means whereby when said lever is moved beyond the high speed position it will be positively connected with said rod, and will remain so connected when the lever is moved back thereafter to low speed positions, and means operated by the rod for causing the brake to be applied when the rod is moved with the lever to the low speed positions of the latter.

2. In a brake, the combination of a pair of springs, a brake shoe under the springs having one end thereof fixed to one end of each spring and the other end freely connected with the other end of each spring, and a pair of links connected with the forward end of the brake shoe and extending forwardly therefrom and pivotally supported at their forward ends.

3. In a brake, the combination of a pair of toggles, a brake shoe, means for expanding said toggles, and springs for connecting said toggles with the brake shoe.

4. In a brake, the combination with a pair of toggles, a rod connecting their lower ends, a pair of springs, means for connecting the springs with said rod, each extending forwardly and rearwardly therefrom, a brake shoe under the springs having one end thereof fixed to one end of each spring and the other end freely connected with the other end of each spring.

5. In a brake, the combination with a pair of toggles, a pair of springs connected with said toggles, each extending forwardly and rearwardly therefrom, a brake shoe under the springs having one end thereof fixed to one end of each spring and the other end freely connected with the other end of each spring, and a pair of links connected with the forward end of the brake shoe and extending forwardly therefrom and pivotally supported at their forward ends.

6. The combination with a vehicle and a speed controlling device therefor comprising a lever, of a brake located between the rear wheels of the vehicle, and means connected with and controlled by said lever for operating said brake, said means being arranged to control the degree of pressure with which the brake is applied.

7. The combination with a vehicle and a speed controlling lever, of a brake, an arm for operating the brake, a rod connected with said arm, and having a notch in the edge, and means on said speed controlling lever for supporting said rod freely and for engaging said notch when the speed controlling lever is moved beyond the high speed position, whereby the brake will be operated by said lever.

8. The combination with a vehicle and a speed controlling lever, of a brake, an arm for operating the brake, a reciprocable rod connected with said arm, and having a notch in the edge, a projection on said speed controlling lever for supporting said rod and engaging said notch when the speed controlling lever is moved beyond the high speed position, and a spring connected with said rod for holding it in a position to engage with the projection.

In testimony whereof I have hereunto set my hand, in the presence of two subscribing witnesses.

EBENEZER CURTIS JENKINS.

Witnesses:
 ALBERT E. FAY,
 C. FORREST WESSON.